(12) United States Patent
Maegawa

(10) Patent No.: US 8,108,212 B2
(45) Date of Patent: Jan. 31, 2012

(54) SPEECH RECOGNITION METHOD, SPEECH RECOGNITION SYSTEM, AND SERVER THEREOF

(75) Inventor: Shuhei Maegawa, Tokyo (JP)

(73) Assignee: NEC Corporation, Tokyo (JP)

(*) Notice: Subject to any disclaimer, the term of this patent is extended or adjusted under 35 U.S.C. 154(b) by 943 days.

(21) Appl. No.: 11/928,922

(22) Filed: Oct. 30, 2007

(65) Prior Publication Data
US 2008/0228480 A1    Sep. 18, 2008

(30) Foreign Application Priority Data
Mar. 13, 2007    (JP) .................................. 2007/63429

(51) Int. Cl.
*G10L 15/26*    (2006.01)
(52) U.S. Cl. ................... 704/235; 704/231; 704/250
(58) Field of Classification Search .................. 704/243, 704/235, 246, 255, 257, 256, 250, 270, 270.1, 704/231; 455/416
See application file for complete search history.

(56) References Cited

U.S. PATENT DOCUMENTS

| | | | |
|---|---|---|---|
| 6,366,882 B1 * | 4/2002 | Bijl et al. ....................... | 704/235 |
| 6,529,871 B1 * | 3/2003 | Kanevsky et al. ............ | 704/246 |
| 6,952,674 B2 * | 10/2005 | Forand .......................... | 704/243 |
| 7,337,115 B2 * | 2/2008 | Liu et al. ....................... | 704/246 |
| 7,542,756 B2 * | 6/2009 | Mason et al. ................. | 455/416 |

FOREIGN PATENT DOCUMENTS

| | | |
|---|---|---|
| JP | 2002091477 | 3/2002 |
| JP | 2002351893 A | 12/2002 |
| JP | 2003330485 A | 11/2003 |
| JP | 2005140988 A | 6/2005 |
| JP | 2005284209 | 10/2005 |
| JP | 2006050500 | 2/2006 |

OTHER PUBLICATIONS

Ryuichi Nisimura et al. "Automatic N-gram Language Model Creation from Web Resources" Eurospeech 2001.*
Japanese Office Action for JP Patent Application 2007-063429, issued Dec. 26, 2008.
Masami Nakamura, "The Congress Minutes Making Support System", Monthly Automatic Recognition, Japan Industrial Publishing Co., Ltd, Oct. 2, 2004, vol. 17, No. 12 (the 224th issue), p. 38-43.
Yuya Akita, et al. "Automatic Archiving System for Meeting Speech", Technical Report of the Institute of Electronics, Information and Communication Engineers (IEICE), IEICE, Dec. 14, 2000, vol. 100, No. 522, p. 61-66.

* cited by examiner

*Primary Examiner* — Huyen X. Vo

(57) ABSTRACT

A speech recognition method comprises model selection step which selects a recognition model based on characteristic information of input speech and speech recognition step which translates input speech into text data based on the selected recognition model.

8 Claims, 16 Drawing Sheets

FIG. 9

NOTICE OF CONFERENCING 401

"Guide To Conference For Marketing Of New Products"
- Sponsor: Taro Yamada
- Date: 2006/12/27 (Wed) 13:00 To 15:00
- Participants: Taro Yamada, Narihiro Ryuzouji, Ouji Ohtomo
- Place: Ohsaka-Jou Hall, Kyushu Branch Office
- Resume
- Market Analysis: http://www.visvoice.co.jp/mk1
- Problems and Solution: http://www.visvoice.com/mk2
- Schedule: http://www.visvoice.com/mk3
- etc.

↓ DATA REGISTRATION

CONFERENCING DATA IN CONFERENCING DATABASE 402

```
<?xml version="1.0" encoding="utf_8"?>
<subject title="guide to conference for new speech recognition development" id="2006120610150 1">
<promoter id="0000020">   Maria Orien   </promoter>
<start>12/2006 10:15</start>
<end>12/2006 12:00</end>
<participant id="000001">Taro Yamada</participant>
<participant id="000002"> Ben Franklin  </participant>
<participant id="000003"> Chin Tantan   </participant>
<place address="0789347"> Tokyo Big Site </place>
<place address="0094047"> Peking Office </place>
<resume url="http://www.visvoice.co.jp/func">related to speech recognition functions</resume>
<resume url="http://www.visvoice.com/dev">direction for software</resume>
<resume url="http://www.visvoice.cn/hd">copper related products</resume>
</subject>
<subject title="guide to conference for marketing of new products" id="2006120713000 1">
<promoter id="000020"> Taro Yamada </promoter>
<start>07/12/2006 13:00 </start>
<end>07/12/2006 15:00 </end>
<participant id="000001"> Taro Yamada </participant>
<participant id="000008"> Narihiro Ryuzouji </participant>
<participant id="000009"> Ouji Ohtomo </participant>
<place address="898947"> Ohsaka-Jou Hall </place>
<place address="138937"> Kyushu Branch Office/ </place>
<resume url="http://www.visvoice.co.jp/mk1"> market analysis 1 </resume>
<resume url="http://www.visvoice.co.jp/mk2"> market analysis 2 </resume>
<resume url="http://www.visvoice.co.jp/mk3"> schedule in the future </resume>
</subject>
<subject titleid=" "> ... </subject>
</conference>
```

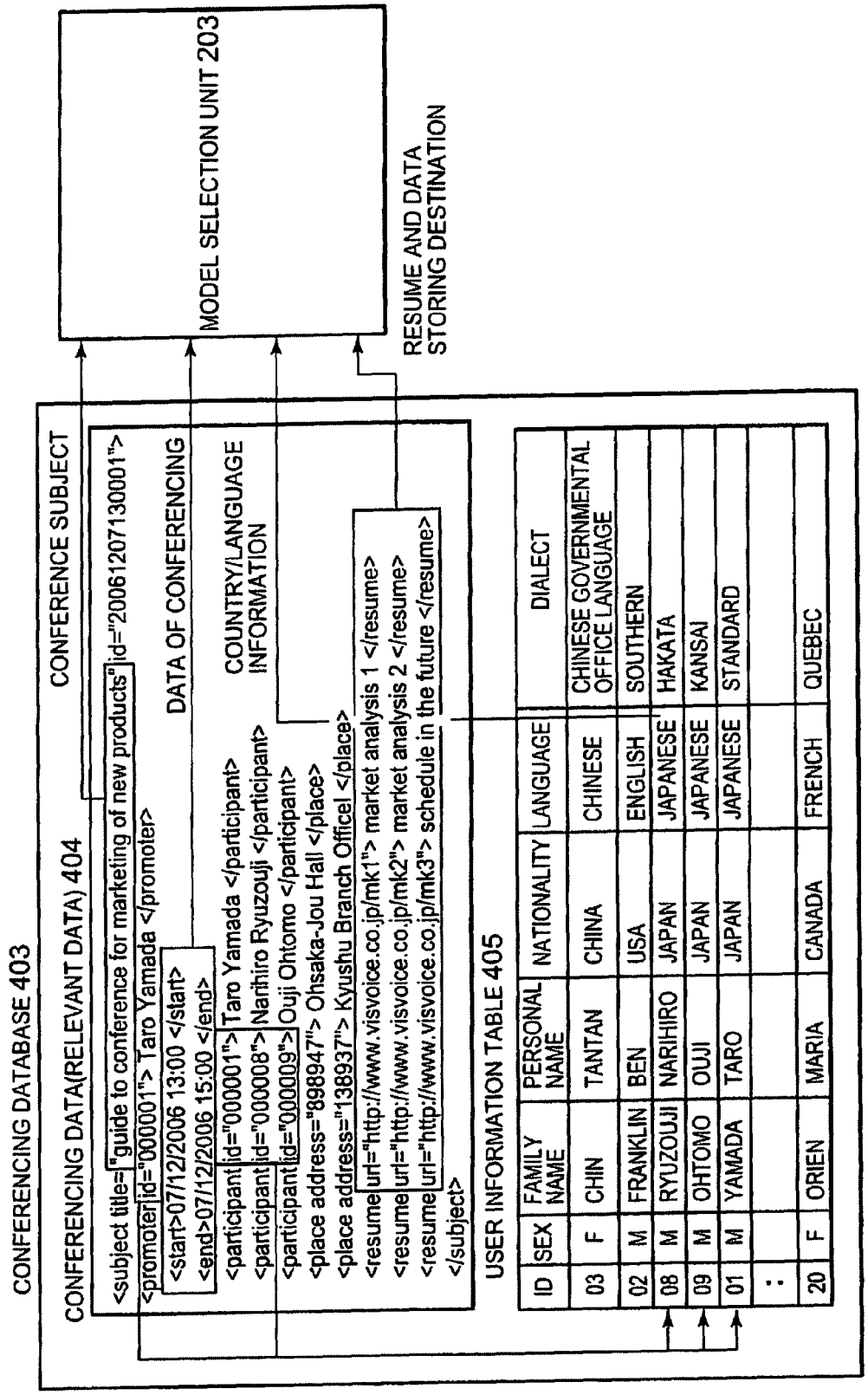

SPEECH RECOGNITION METHOD, SPEECH RECOGNITION SYSTEM, AND SERVER THEREOF

RELATED APPLICATIONS

This application is based on Japanese patent Application No. JP 2007-63429 filed on Mar. 13, 2007, and including a specification, claims, drawings and summary. The disclosure of the above Japanese Patent Application is incorporated herein by reference in its entirety.

BACKGROUND OF THE INVENTION

The present invention relates to a speech recognition method, a speech recognition system, and a server thereof, and more particularly to a speech recognition method, a speech recognition system, and a server thereof, improved in speech recognition rate respectively.

Because conference participants are usually requested to record the minutes of the conference proceedings during the conference, it comes to need much labor and care to avoid listening and writing errors. Therefore, there have been proposed various techniques related to speech recognition so far to enable such speech recognition results to be output as text data.

Also, JP-A No. 2006-50500 discloses such a speech recognition related technique for recording minutes of conference proceedings. FIG. 1 shows a system for recording minutes of conference proceedings disclosed in the patent document of JP-A No. 2006-50500. This system includes a plurality of client units 907 and a conference server 905 which sends speech information to those client units from itself and controls the whole conference proceedings. This system works as follows. Each client unit 907 receives speeches of conference participants through an input unit as text or voice data in real time. Each speech received in such a way is translated into text data in a speech recognition process by a speech-text translation unit. Then, a speech text editing/management unit displays at least part of the translated text data for the conference participants and the person in charge of the conference while accepting inputs of correction or approval for the text data from the participants or the person in charge of the conference in real time during the conference. Because this system supports the conference proceedings in real time, this system improves the quality of the conference including the judgments and speeches of the participants and the conference time is reduced and the minutes of the conference proceedings are recorded efficiently.

On the other hand, JP-A No. 2005-284209 discloses a speech recognition related technique for improving the recognition rate by updating the language model. FIG. 2 shows a speech recognition system disclosed in JP-A No. 2005-284209. This system includes a correlation unit 911, an important word extraction unit 914, a text DB 916, and a language model learning unit 915. The correlation unit 911 makes correlation between an input speech and an acoustic model 913 with use of a language model 912. The important word extraction unit 914 extracts an important word representing a conference subject from a correlation result. The text DB 916 stores text data related to each important word. The language model learning unit 915 searches target text data in the text DB 916 based on an important word extracted by the important word extraction unit 914. This speech recognition system learns and generates a language model on the basis of the searched text data.

The speech recognition system shown in FIG. 2 works as follows. The correlation unit 911 makes correlation between an input speech and an acoustic model 913 representing the characteristics of a speech with use of a language model 912. The initial language model 912 is generated by learning news items, etc. The correlation unit 911 obtains and sends a recognition result consisting of a word string and a very high correlation score to the important word extraction unit 914. The important word extraction unit 914 then extracts a conference subject from the recognition result received from the correlation unit 911 and sends the extracted important word and a degree of its importance to the language model learning unit 915. The language model learning unit 915 searches target text data in the text DB 916 based on a keyword which is an important word extracted by the important word extraction unit 914, and obtain its related text data, and then calculates a connection possibility of a word on the basis of the obtained text data to learn a language model. The language model learning unit 915 updates the language model 912 with the language model generated by learning. This speech recognition system uses the updated language model 912 and the acoustic model 913 to make next speech recognition. This speech recognition system extracts text data related to the relevant conference subject and learns the language model and makes speech recognition with use of the language model, thereby improving the accuracy of the text to be used.

JP-A No. 2002-091477 also discloses a speech recognition related technique for improving the recognition rate by updating a language model with use of a speech recognition technique. FIG. 3 shows a speech recognition system disclosed in JP-A No. 2002-091477. This speech recognition system is composed of an acoustic model management server 952, a language model management server 953, and an speech recognition unit 951. In the fourth embodiment of the invention, this system further includes a user utilizing text storing means and a user utilizing depending language model building-up means characteristically. In this fourth embodiment, the system refers to a user utilizing text and the latest updated language data 934 to build up a language model appropriately to the user utilizing text. This speech recognition system works as follows. The user utilizing text obtaining means of the language model management server 953, receiving a language model update instruction 932, scans a file and a directory specified by the user in advance to read a text file referred to or described by the user. The user utilizing text storing means stores texts collected by the user utilizing text obtaining means. The user utilizing text depending language model building-up means refers to the user utilizing text and the updated language data 934 to build up a language model so as to improve the recognition rate. In a process for building up a language model with use of a user utilizing text, for example, the user utilizing text is regarded as a text to be identified to build up a language model which depends on the user utilizing text. A language model built up in such a way includes the characteristics of texts referred to by the user or existing texts, the language model includes language characteristics with which the user might make a speech at a higher possibility, thereby the language model enables recognition results to be obtained at a higher accuracy.

As described above, according to JP-A No. 2006-50500, it enables to learn a speech recognition dictionary and provided with a related document DB, a technical terms dictionary DB, and a conference keywords DB so as to store information required for speech recognition. According to JP-A No. 2005-284209, the system is provided with a text DB for storing text data related to important words and enabled to search text data in the text DB and learn a language model. Still JP-A No. 2002-091477 builds up a language model which depends on user utilizing texts.

However, none of those patent documents describes any means for keeping dictionary data accurately at a constant amount with respect to means for adding and updating information of each language model. Therefore, if dictionary data exceeds a certain amount, the speech recognition speed and recognition rate are lowered. If a conference subject/contents are changed after a language model is created, the user is required to add/update the necessary data manually. The language model is also required to be improved through learning in conferences. Otherwise, recognition results are not displayed correctly. Also, any of those patent documents describes how to cope with participants who speak different dialects simultaneously.

In such a way, according to any of the above described speech recognition related techniques, if created dictionary data is registered in a language model, the recognition speed and recognition rate are lowered as the number of vocabularies increases so as to correspond to widely discussed conference subjects. This has been a problem. Also, even when there are prepared a plurality of language models, it has been required much time and labor to switch among those language models and this results even in switching errors. The recognition rate also depends on what dialect is spoken. Even when language and acoustic models are switched to dialect ones, much labor and time are required to make manual switching and this often causes switching errors.

Under such circumstances, it is an object of the present invention to provide a speech recognition method, a speech recognition system, and a server thereof, improved respectively in recognition rate by optimizing language and acoustic models.

SUMMARY OF THE INVENTION

An object of the present invention is to provide a speech recognition method, a speech recognition system, and a server thereof, improved respectively in speech recognition rate.

According to one aspect of the present invention, a speech recognition method is provided with a model selection step which selects a recognition model based on the characteristic information of an input speech and a speech recognition step which translates the input speech into text data based on the selected recognition model.

According to one aspect of the present invention, a speech recognition system includes model selection means which selects a recognition model based on the characteristic information of an input speech and translation means which translates the input speech into text data based on the selected recognition model.

According to one aspect of the present invention, a server is provided and it is connected to a distribution terminal for distributing a recognition model and a user terminal for recognizing an input speech and a server through a network, the server comprising model selection means which selects the recognition model based on the characteristic information of the speech input in the user terminal and indication means which indicates the selected recognition model to the user terminal.

BRIEF DESCRIPTION OF THE DRAWINGS

Other features and advantages of the invention will be made more apparent by the following detailed description and the accompanying drawings, wherein:

FIG. 9 is a diagram for showing an example of a conferencing notice and conferencing data;

FIG. 10 is a diagram for showing an example of conferencing data and a user information table;

In the drawings, the same reference numerals represent the same structural elements.

DETAILED DESCRIPTION OF THE PREFERRED EMBODIMENTS

The present invention will be described in detail below with reference to the accompanying drawings.

One of the features of the present invention is to improve the recognition rate in speech recognition processes through automatic changes to the optimal recognition model.

A first embodiment of the present invention will be described in detail below.

Figure 1:
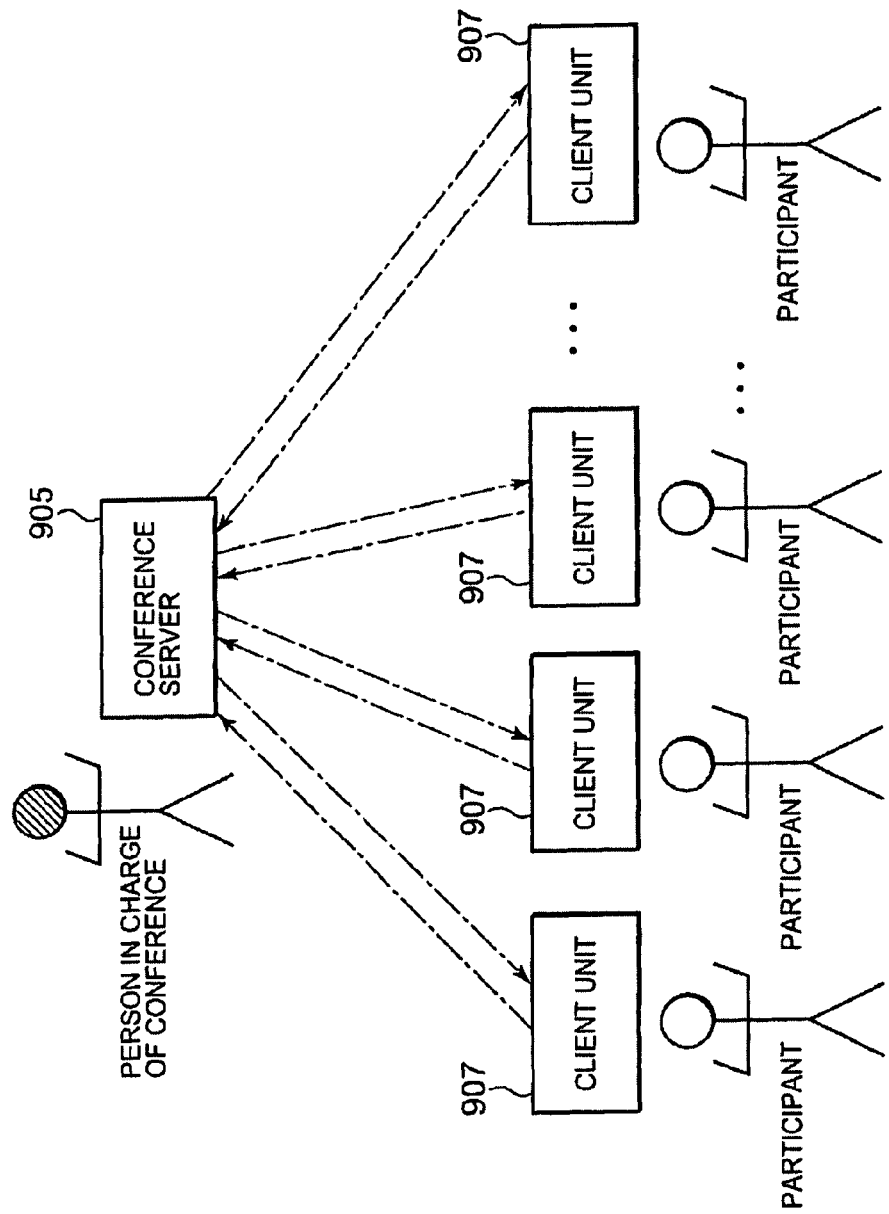
FIG. 1 is a block diagram for showing a minutes recording unit according to a first related technique.
Figure 2:
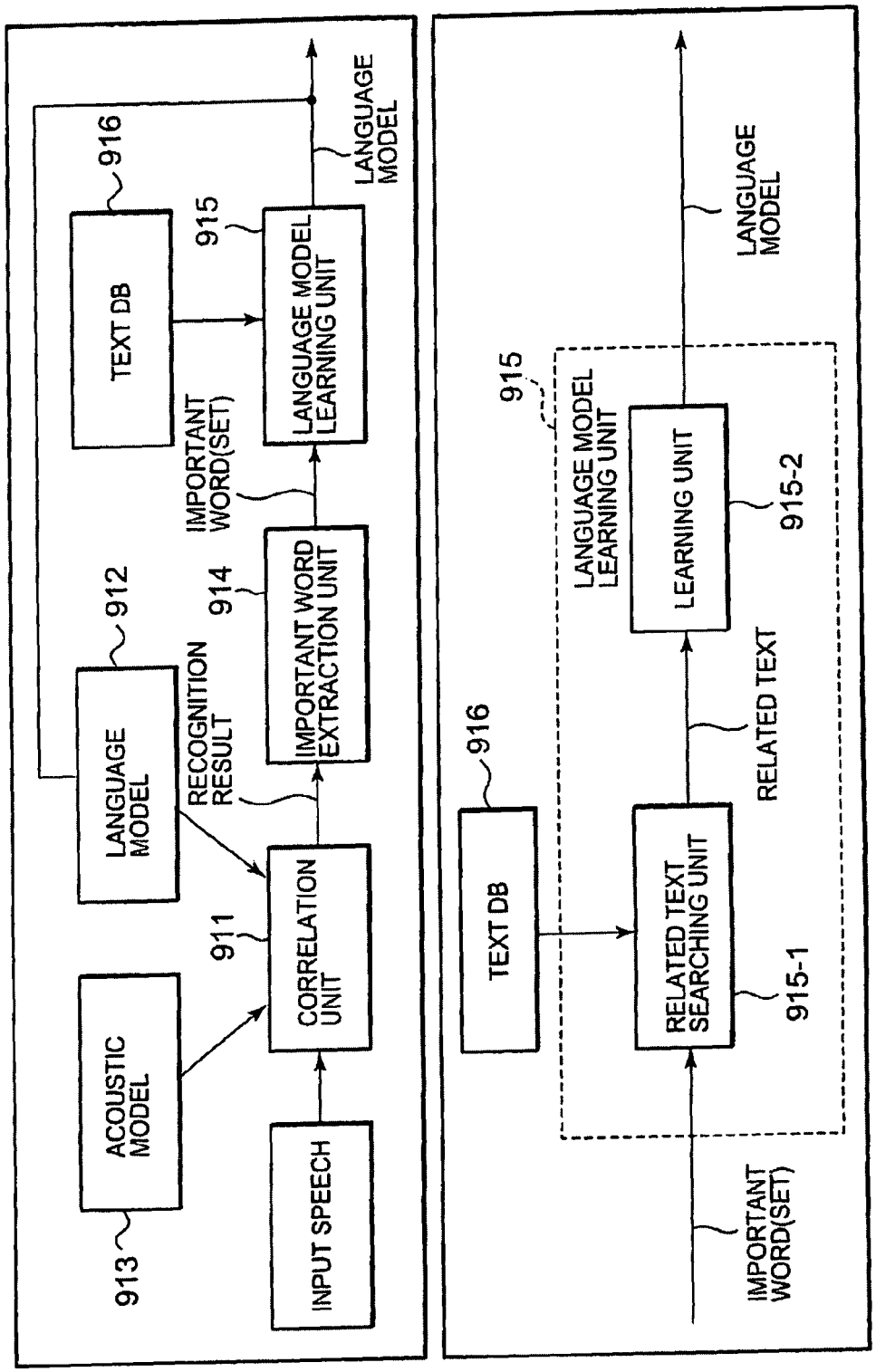
FIG. 2 is a block diagram for showing a minutes recording unit according to a second related technique.
Figure 3:
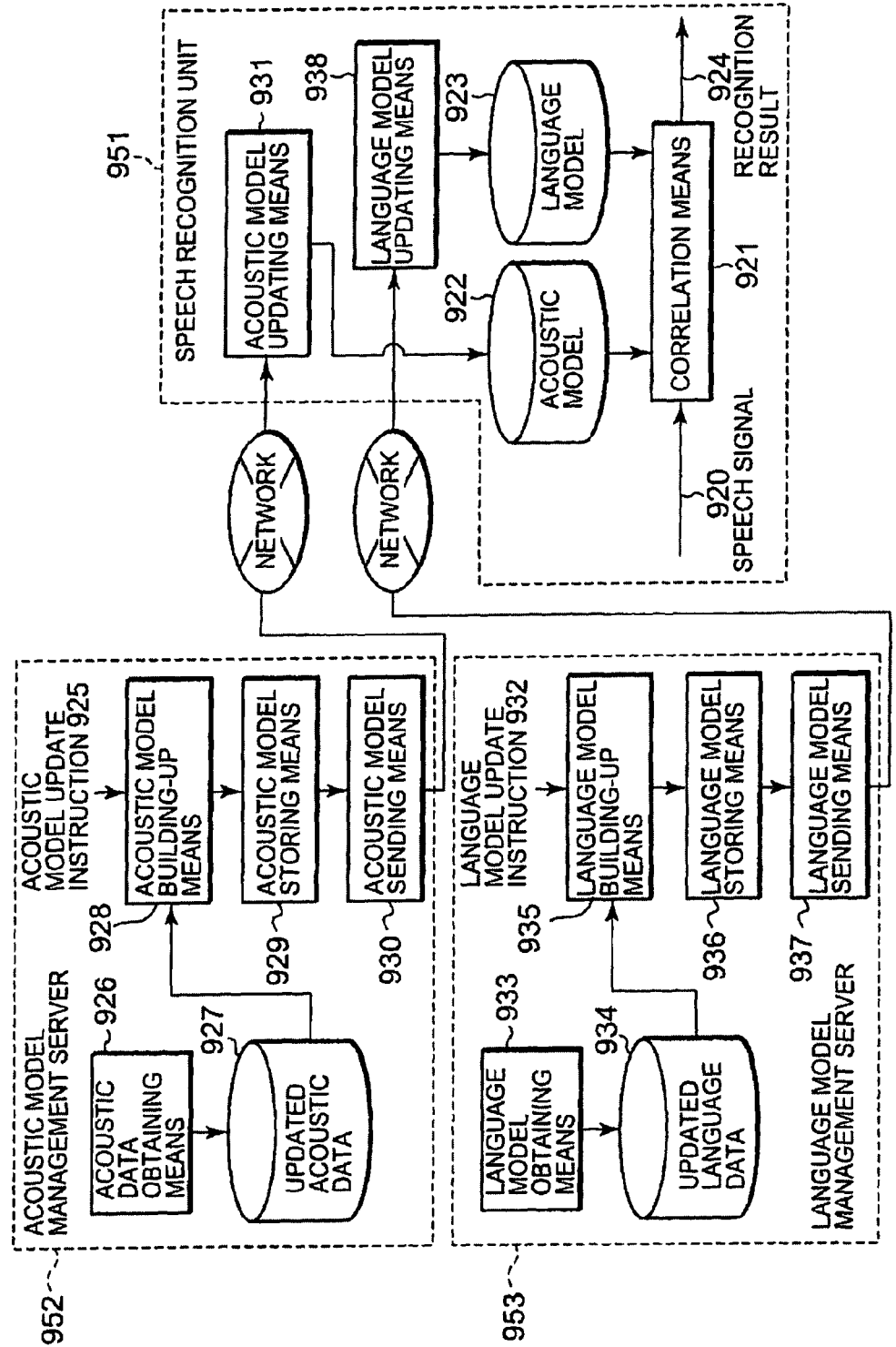
FIG. 3 is a block diagram of a minutes recording unit according to a third related technique.
Figure 4:
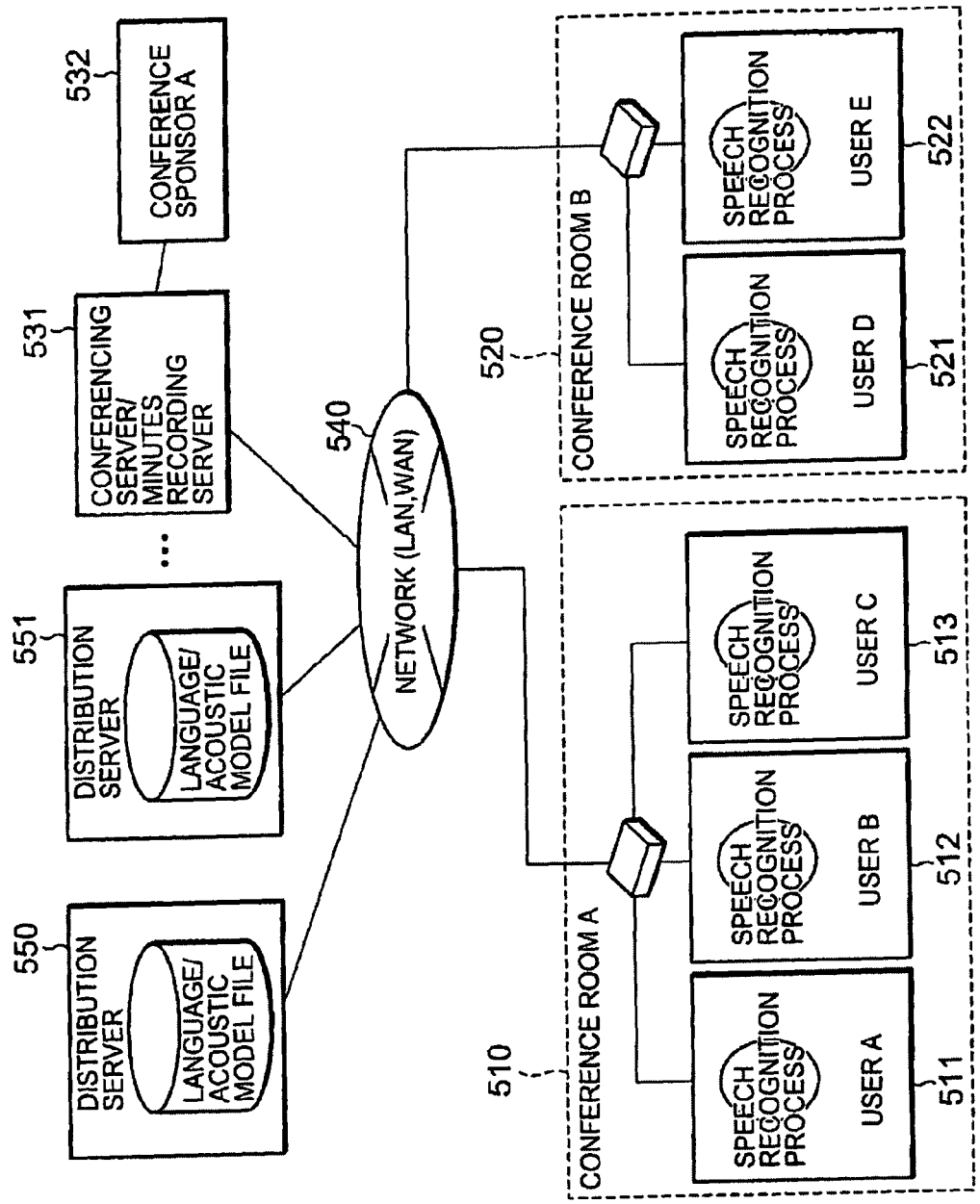
FIG. 4 is a concept diagram for showing a configuration of a minutes recording unit in a first embodiment of the present invention.

As shown in FIG. 4, in this first embodiment, terminals (511, 512, and 513) in a conference room A, terminals (521 and 522) in a conference room B, a server 530, and distribution servers (550, 551, . . . ) are connected to each another through a network 540. The distribution servers (550, 551, . . . ) are used for distributing recognition models. Here, an example of servers is a conferencing server/conference minutes recording server 531. The speech recognition system in this first embodiment works as follows. At first, a conference sponsor 532 registers conference characteristic information in the conferencing server 531 before opening the conference. The characteristic information includes conference subject information, language information, and relevant information relating to input speeches. The language information includes dialect information of each user. The relevant information relating to input speeches includes resume information of the conference. The conferencing server 531 selects a recognition model optimized to the characteristic information stored in a conferencing database automatically from among the distribution servers (550, 551, . . . ). Also, before opening the conference, each of the terminals (511, 512, 513, 521, and 522) in the conference rooms A and B downloads the selected recognition model. The recognition model includes a language model and an acoustic model. At this time, each of the terminals (511, 512, 513, 521, and 522) in the conference rooms A and B is executing a speech recognition process and an IP telephone service. A user's speech inputted through a microphone connected to each of the terminals (511, 512, 513, 521, and 522) in the conference can be heard at each of those terminals. At the same time, a speech recognition result is sent to the referencing server 531 through a network and registered therein as conference minutes data. Each of the terminals (511, 512, 513, 521, and 522) in the conference rooms A and B can refer to this conference minutes by connecting itself to the minutes recording server 531. Thus the conference information can be recorded without requiring any user to write the conference information.

The speech recognition process executed in each of the terminals (511, 512, 513, 521, and 522) starts speech recognition after switching over to the downloaded one. This is why optimal conference minutes can be obtained in each of conference subject fields (e.g., technology, marketing, sales, general affairs, etc.). In addition, because acoustic models are switched over automatically, the minutes are displayed appropriately to the language and dialect of each speaker.

Figure 5:
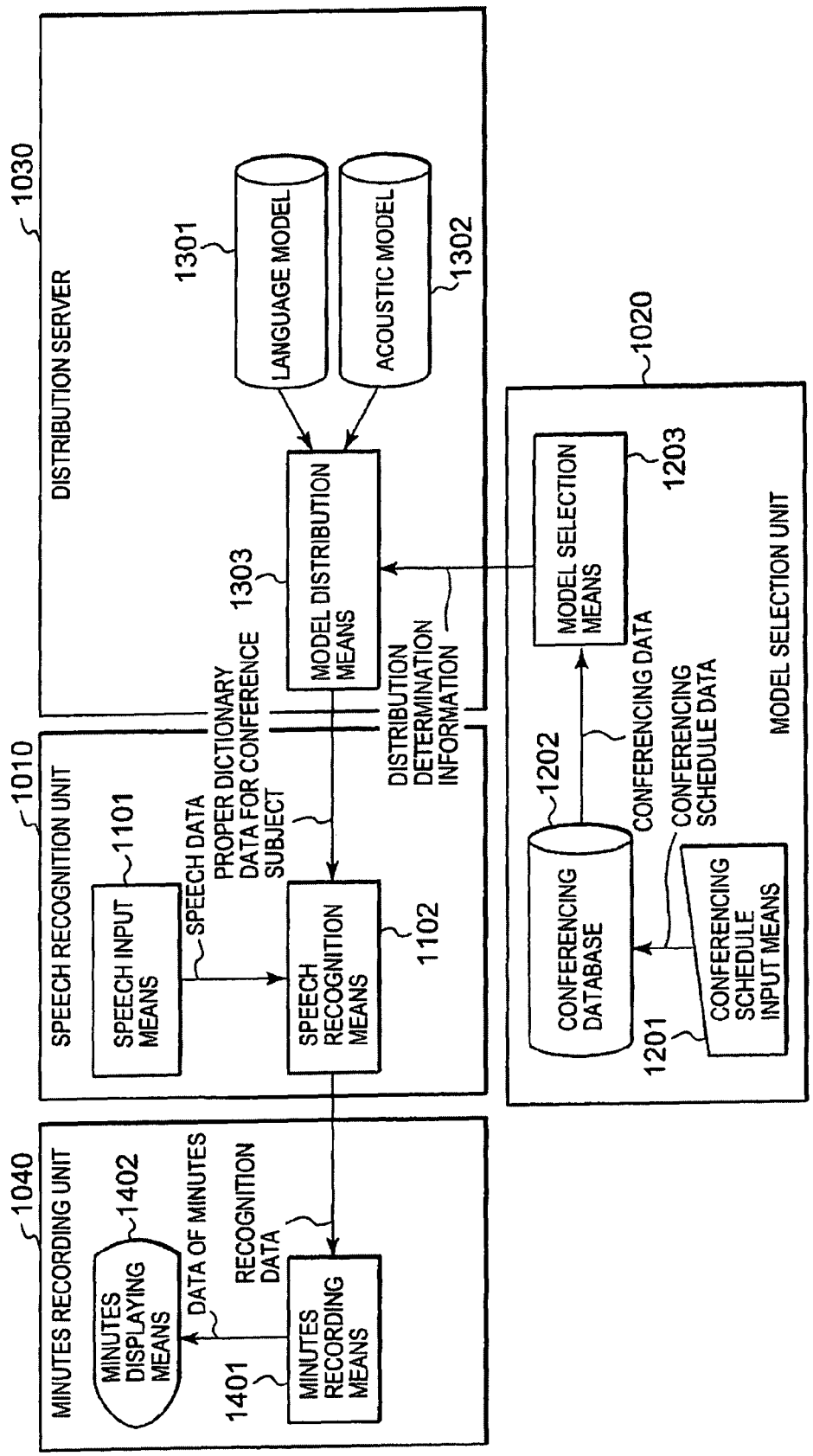
FIG. 5 is a block diagram of a configuration of a minutes recording unit.

Next, there will be described a configuration of the speech recognition system in this first embodiment of the present invention with reference to the accompanying drawings. FIG. 5 shows a speech recognition system in this first embodiment of the present invention. The system includes a speech recognition unit 1010, a model selection unit 1020, a distribution server 1030, and a minutes recording unit 1040. The speech recognition unit 1010 includes a speech input means 1101 and a speech recognition means 1102. The model selection unit 1020 includes a conferencing schedule input means 1201, a conferencing database 1202, and a model selection means 1203. The distribution server 1030 includes a language model 1301, an acoustic model 1302, and a model distribution means 1303. The minutes recording unit 1040 includes a minutes recording means 1401 and a minutes displaying means 1402.

Those means work as follows respectively. At first, the conference sponsor 532 inputs conference characteristic information from the conferencing schedule input means 1201 before opening the conference and stores the information in the conferencing database 1202. Then, the model selection means 1203 selects a language model and an acoustic model properly on the basis of the characteristic information stored in the conferencing database 1202. The model selection means 1203 then notifies those selected language and acoustic models to each of the terminals (511, 512, 513, 521, and 522), thereby each of the terminals (511, 512, 513, 521, and 522) downloads those language and acoustic models. The speech recognition means 1102 executes the speech recognition process on the basis of the speech inputted from the speech input means 1101 and the dictionary data obtained from the model distribution means 1303 and translates the inputted speech into text data to be assumed as recognition data. The speech recognition means 1102 then passes the recognition data to the minutes recording means 1402. The minutes recording means 1402 receives the recognition data for each user through a network and generates minutes data. The minutes recording means 1402 displays the minutes data on the user's terminal screen.

Figure 6:
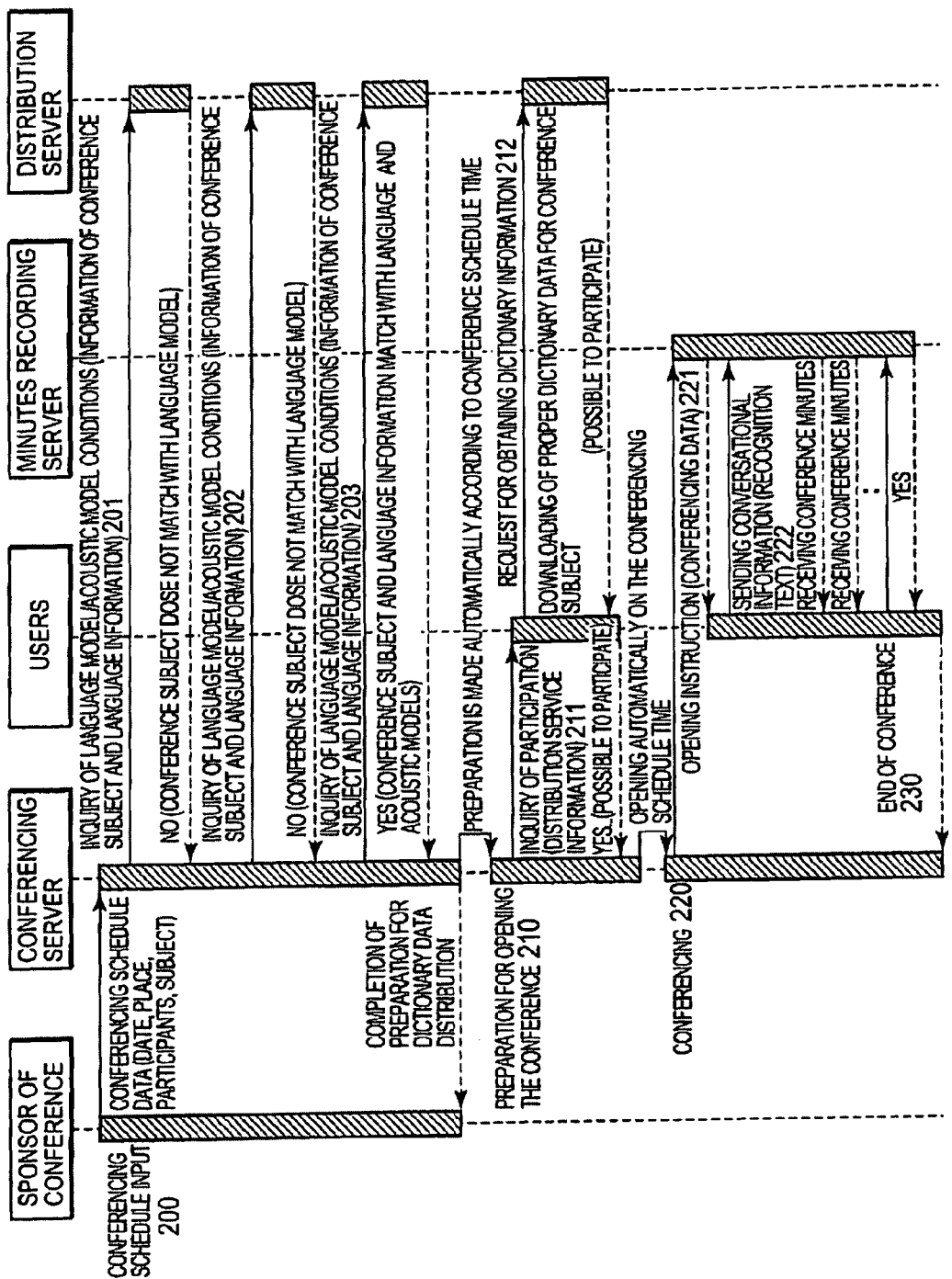
FIG. 6 is a block diagram of a configuration of a minutes recording unit.
Figure 7:
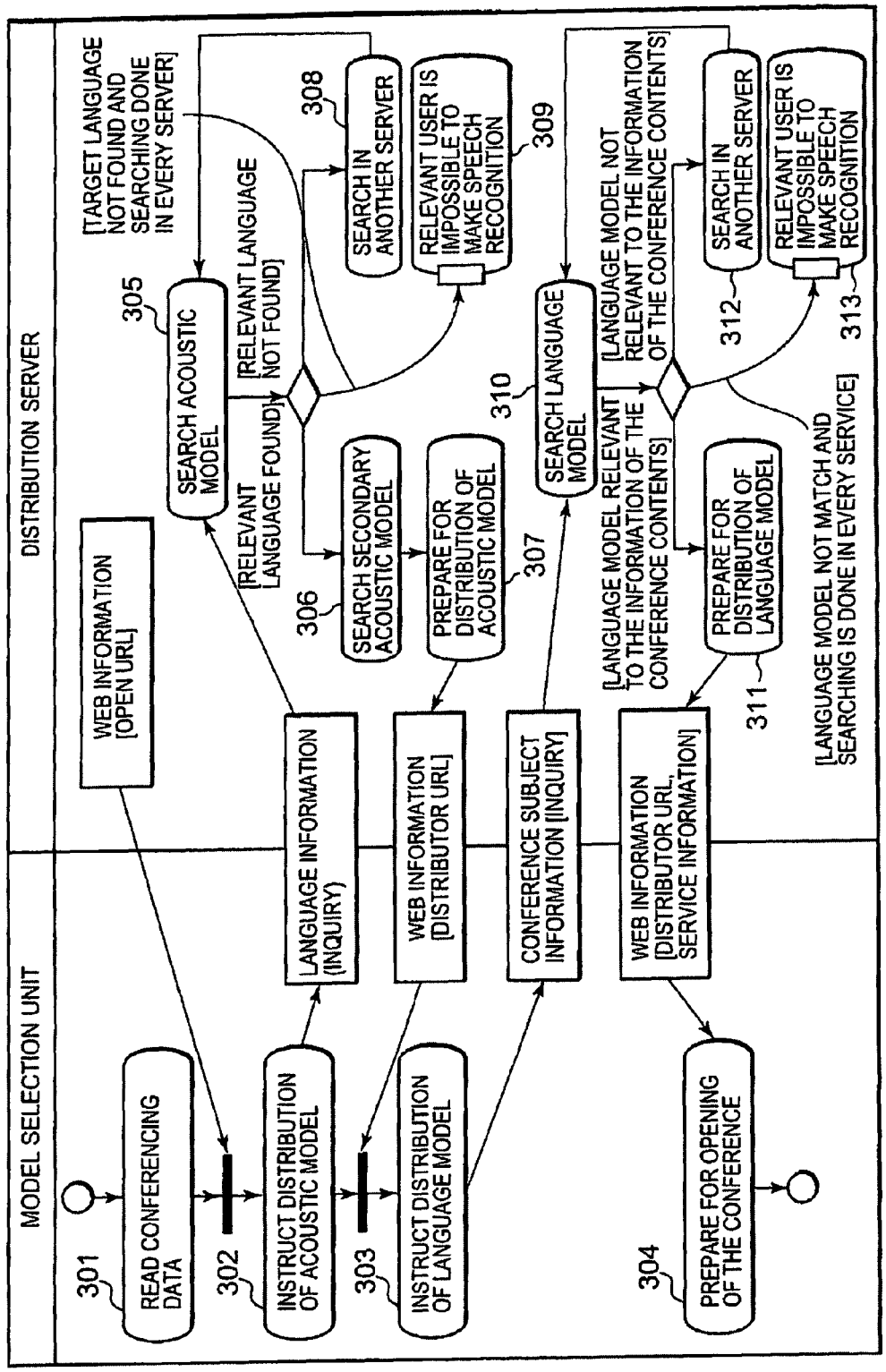
FIG. 7 is a diagram of the first activity for showing the operation of a minutes recording unit.

Next, there will be described details of the operation of the speech recognition system in the first embodiment of the present invention with reference to a sequence diagram shown in FIG. 6, as well as activity diagrams shown in FIGS. 7 and 8. At first, the conference sponsor 532 inputs the conferencing schedule data before opening the conference and register the schedule data in the conferencing server 531 (step 200 in FIG. 6). FIG. 9 shows an example of how a conferencing notice 401 translated into XML data is registered as conferencing data 402. Next, the conference sponsor 532 searches an optimal distribution server from among those (550, 551, . . . ). In FIG. 6, the conference sponsor 532 makes an inquiry to one of the distribution servers (550, 551, . . . ) on the basis of the subject and language information included in the characteristic information. If the conference subject information and the language model do not match with each other in the inquired distribution server, that is, if the distribution server (550, 551, . . . ) does not have a language model corresponding to the conference subject information, the conference sponsor 532 receives an answer from the distribution server (steps 201 and 202 in FIG. 6). Then, the conference sponsor 532 further makes an inquiry to another distribution server. As a result, the conference sponsor 532 receives an answer indicating that the conference subject information and language information match with the language and acoustic models from a distribution server (step 203 in FIG. 6). FIG. 7 shows details of this process from inquiry to answer.

The model selection unit 1020 obtains WEB information from the distribution server 1030 and reads conferencing data (step 301 in FIG. 7). Then, the model selection unit 1020 executes an acoustic model distribution instruction 302. In response to this acoustic model distribution instruction 302, language information is sent to the distribution server 1030. After that, the distribution server 1030 makes acoustic model searching 305. FIG. 8 shows details of the acoustic model distribution instruction 302 shown in FIG. 7.

Figure 8:
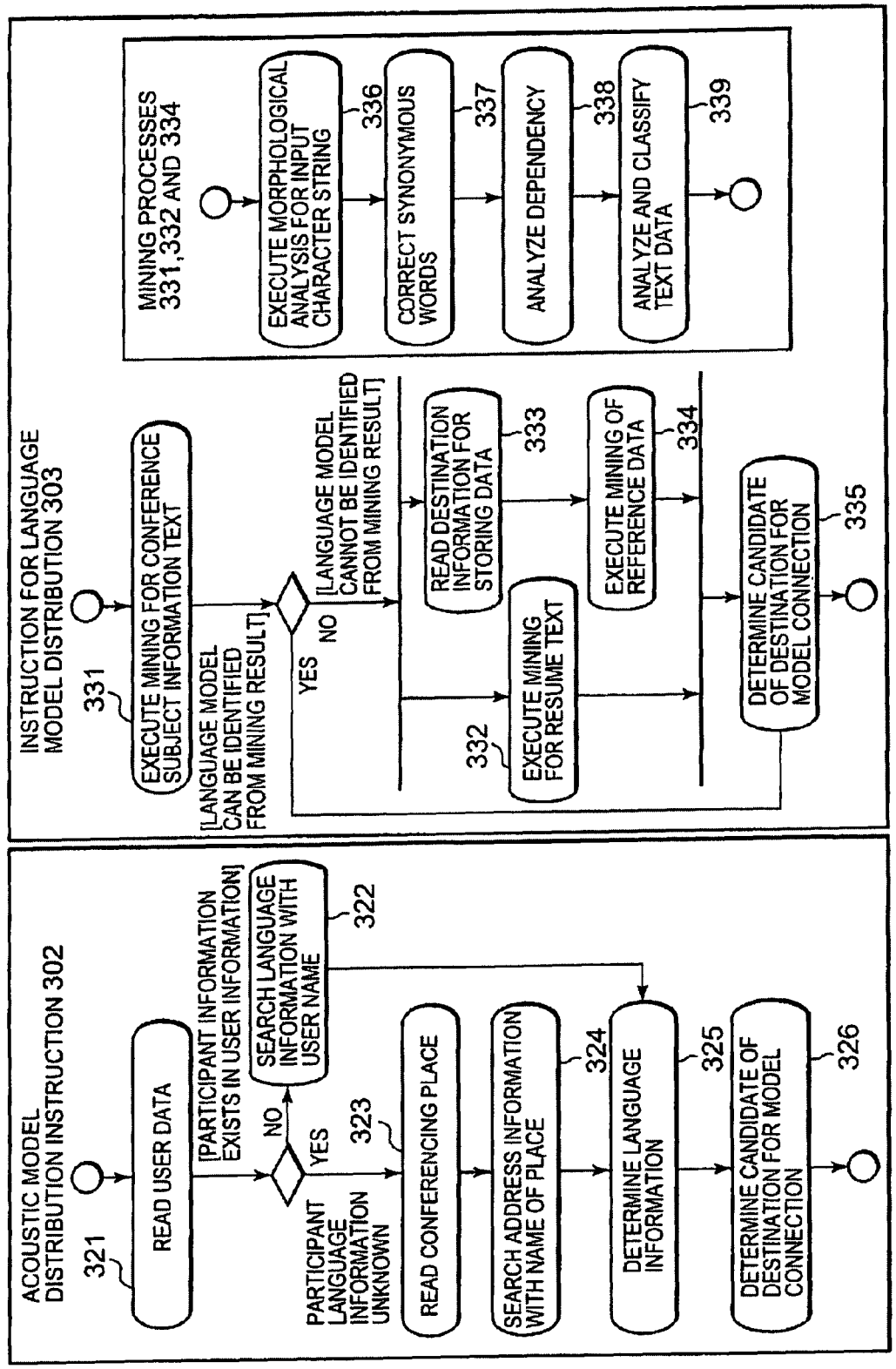
FIG. 8 is a diagram of the second activity for showing the operation of the minutes recording unit.
Figure 11:
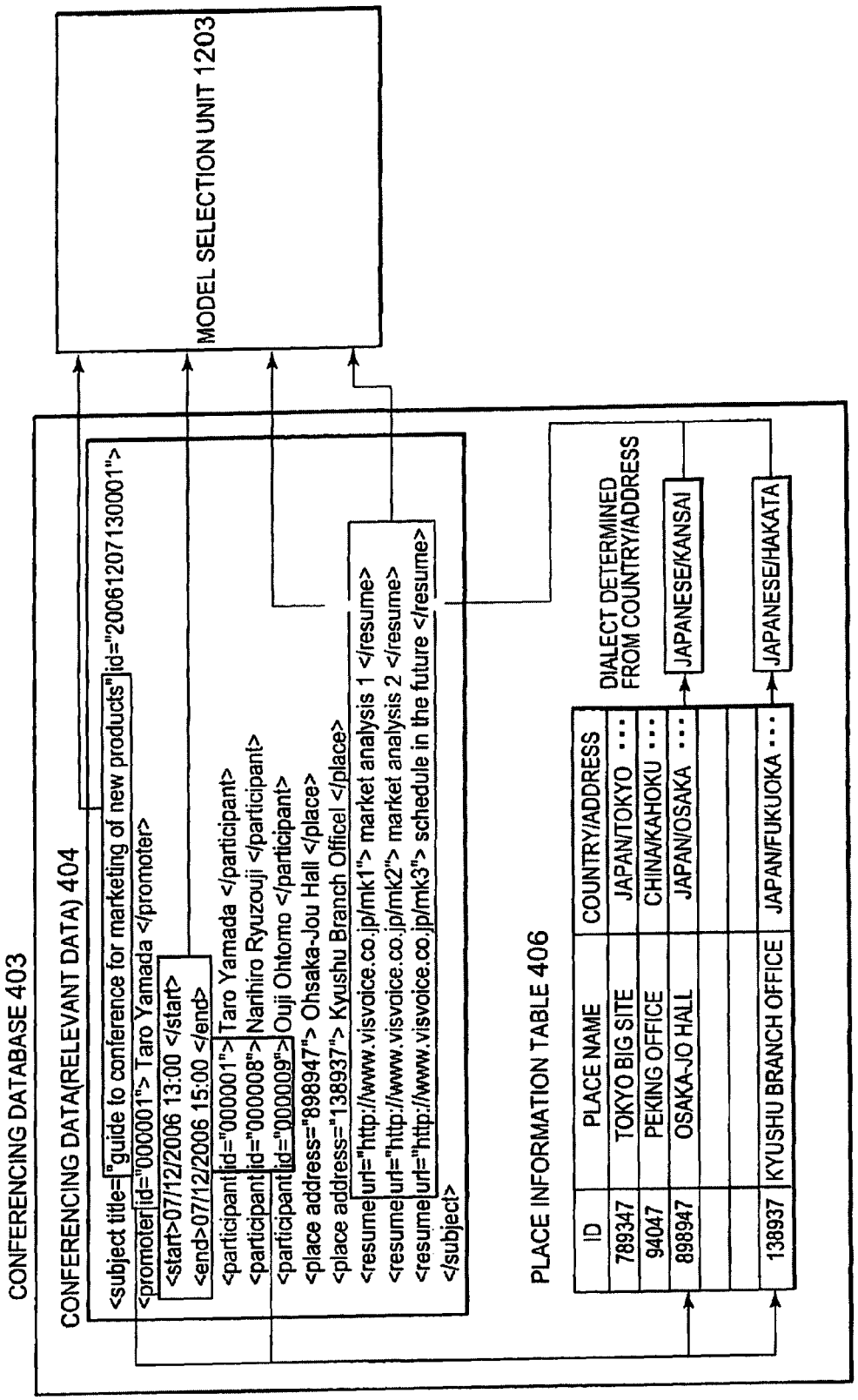
FIG. 11 is a diagram for showing an example of conferencing data and conferencing place information.
Figure 12:
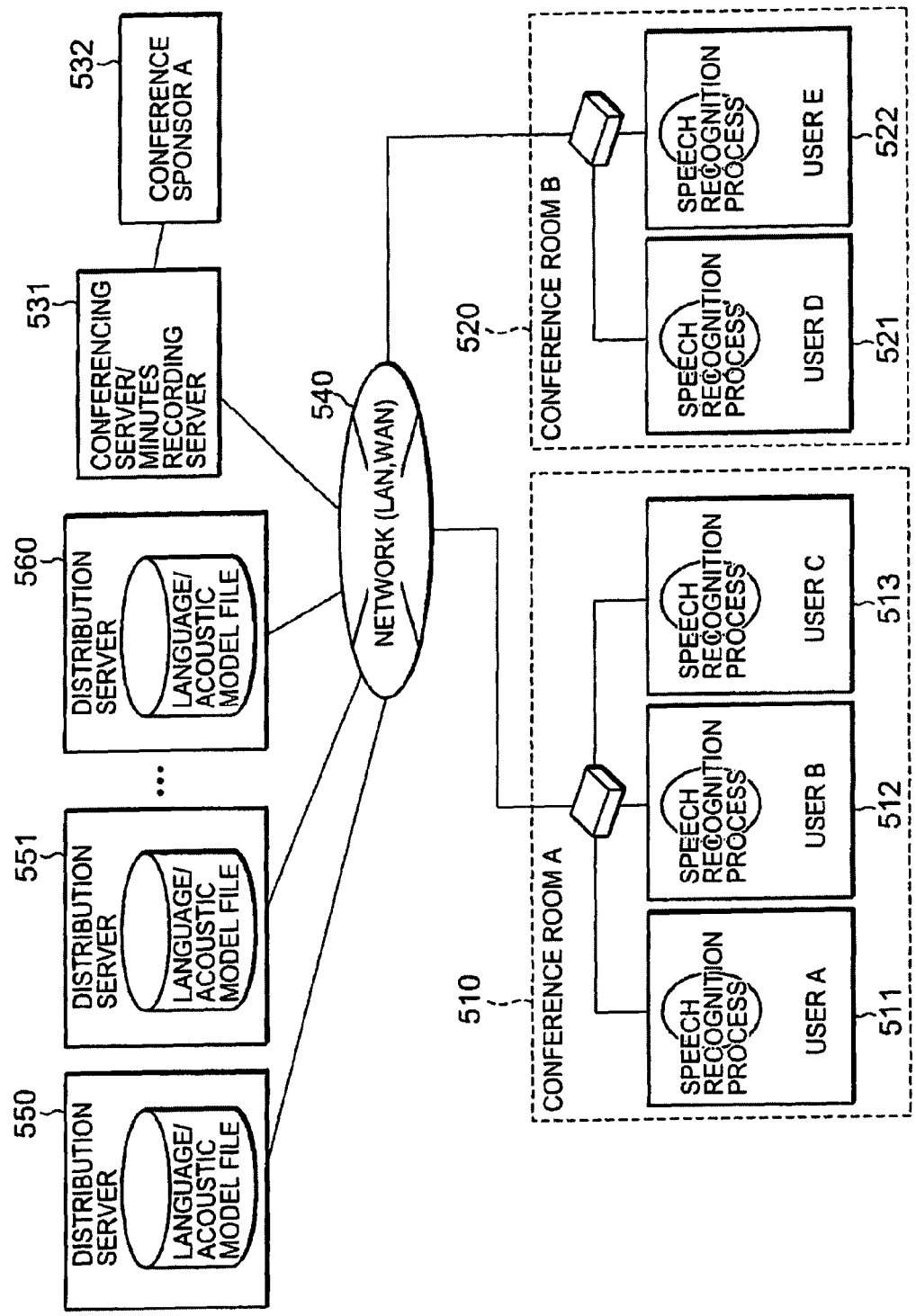
FIG. 12 is a concept diagram for showing a configuration of a minutes recording unit in a second embodiment of the present invention.

If the user information (read in step 321 in FIG. 8) includes language information, the model selection unit 1020 searches and extracts the language information (steps 322 and 325 in FIG. 8). Here, it is also possible to prepare the conferencing data 404 and the user information table 405 in advance and send both subject information and language information to the model selection means 1203 according to those data. FIG. 10 shows such an example. If language information cannot be identified at that time, the model selection unit 1020 reads the conferencing place and determines the language information according to the place name (steps 323 and 324 in FIG. 8). Here, it is also possible to prepare both conferencing data 404 and conferencing place table 406 in advance and send both subject information and language information to the model selection means 1203 according to those data. FIG. 11 shows such an example. The model selection unit 1020 determines information indicating a destination of model connection in such a way (step 326 in FIG. 8).

In the acoustic model searching 305 shown in FIG. 7, the distribution server 1030 searches the target language according to the received language information. If the language is not found in its own server, the distribution server 1030 executes the server searching 308 until the language is found as many times as the number of distribution servers (550, 551, . . . ). If the language is found, the distribution server 1030 determines an acoustic model matching with the dialect information included in the language information in the acoustic model secondary searching 306 and executes a process of acoustic model distribution preparation 307. In the process of acoustic model distribution preparation 307, the distribution server 1030 returns the distributor URL information to the conferencing server 531. In such a way, the acoustic model downloading source is determined.

After that, the model selection unit 1020 executes the language model distribution instruction 303. In response to this language model distribution instruction 303, the conference subject information is sent to the distribution server 1030. Then, the distribution server 1030 executes a process of language model searching 310. FIG. 8 shows details of the process for executing the language model distribution instruction 303.

The model selection unit 1020 then executes text mining for the conference subject information included in the conferencing data 404 (step 331 in FIG. 8) and determines the information indicating a destination of model connection at this time (step 335 in FIG. 8) if it is possible to identify the language model from the mining result. If the language model cannot be identified from the mining result, the model selection unit 1020 executes text mining for the resume information assumed as related information of the input speech (step 332 in FIG. 8) and downloads the information from the reference material stored place at the same time, then executes text mining for those reference materials (steps 333 and 334 in FIG. 8). The model selection unit 1020 determines the model connection destination information from those two mining results (step 335 in FIG. 8).

In the process of language model searching 310 shown in FIG. 7, the distribution server 1030 searches a language model on the basis of the received conference subject information. If the language model is not found in its own service, the distribution server 1030 executes another service searching 312 until the language model is found as many times as the number of WEB services. In the language model distribution preparation 311, the distribution server 1030 determines a language model matching with the conference subject information and returns the relevant URL and service information to the conferencing server 531. The distribution server 1030 then repeats execution of the acoustic model distribution instruction 302 and the language model distribution instruction 303 as many times as the number of users to prepare dictionary data before opening the conference.

Before opening the conference, the conferencing server 531 also confirms if the users can participate in the conference (steps 210 and 211 in FIG. 6) and each user, if possible to participate in the conference, downloads the dictionary data from one of the distribution servers (550, 551, ...) (step 212 in FIG. 6). When the conferencing time comes, the conferencing server 531 sends conferencing data to the minutes recording server 531 (step 221 in FIG. 6). Consequently, each of the terminals (511, 512, 513, 521, and 522) is enabled to receive each input speech as minutes data (step 222 in FIG. 6). Thus the conferencing server 531 keeps recording of the conference minutes until the end of the conference (step 230 in FIG. 6).

Next, there will be described the effects of the first embodiment of the present invention. In this first embodiment of the present invention, a language model and an acoustic model are downloaded automatically on the basis of conferencing data, thereby the language and acoustic models are usable as proper speech recognition dictionaries. Consequently, in this first embodiment, it is expected that proper recognition results are obtained with respect to the conference subject. In addition, an acoustic model can be selected according to not only language information, but also dialect information of each user. The first embodiment thus makes it possible to translate the dialect of each user into the standard language, thereby the conference minutes are recorded in the standard language.

The first effect of this first embodiment is to enable speeches to be translated into text data appropriately to each conference subject, thereby improving the speech recognition rate. This effect is achieved by enabling a language model to be determined from conferencing data appropriately to each recognition field, the language model to be distributed automatically to each terminal before opening the conference, then enabling automatic switching among dictionaries.

The second effect is to enable the dialect of each speech to be translated into the standard language which is easy to be recognized upon recording conference minutes. This effect is achieved by distributing an acoustic model corresponding to the pronunciation specific to each dialect automatically to each user's terminal.

Next, a second embodiment of the present invention will be described in detail.

Figure 13:
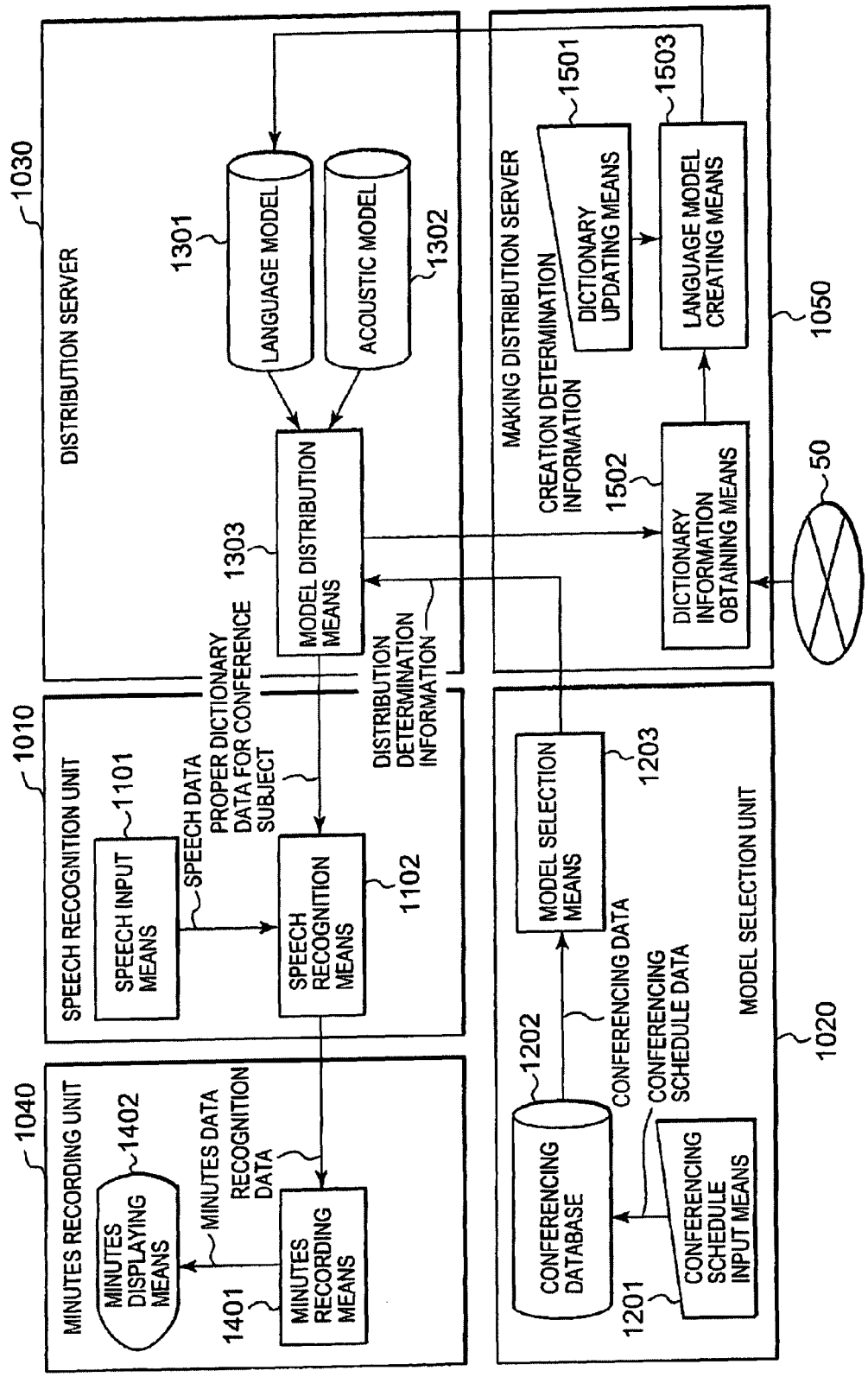
FIG. 13 is a block diagram of another configuration of the minutes recording unit.

The second embodiment of the present invention is achieved by adding a making distribution server 560 to the speech recognition system in the first embodiment (FIG. 4). Other components in the configuration of the second embodiment are the same as those in the first embodiment. The making distribution server 560 has a function for collecting dictionary information in each field and creating a new recognition model according to the collected dictionary information, as well as a function for adding the created recognition model to the recognition model choices of the model selection means 1203. As shown in FIG. 13, in this second embodiment, the system includes a speech recognition unit 1010, a model selection unit 1020, a distribution server 1030, a minutes recording unit 1040, and a making distribution server 1050. The speech recognition unit 1010 includes a speech input means 1101 and a speech recognition means 1102. The model selection unit 1020 includes a conferencing schedule input means 1201, a conferencing database 1202, and a model selection means 1203. The distribution server 1030 includes a language model 1301, an acoustic model 1302, and a model distribution means 1303. The minutes recording unit 1040 includes a minutes recording means 1401 and a minutes displaying means 1402. The making distribution server 1050 includes a dictionary updating means 1501, a dictionary information obtaining means 1502, and a language model creating means 1503.

Those means work as follows respectively. At first, the conference sponsor 532 inputs the conference characteristic information through the conferencing schedule input means 1201 before opening the conference and stores the information in the conferencing database 1202. Then, the model selection means 1203 selects a language model and an acoustic model properly according to the characteristic information read from the conferencing database 1202 and notifies the selected language and acoustic models to each of the terminals (511, 512, 513, 521, and 522) so that each terminal downloads those models. The dictionary information obtaining means 1502 collects dictionary information word by word in each field from the Internet 50, etc. in advance. The language model creating means 1503 creates a language model 1301 on the basis of the dictionary information obtained from the dictionary information obtaining means 1502 and the dictionary updating means 1501 and disposes the language model 1301 in a proper WEB service. The speech recognition means 1102 executes a speech recognition process on the basis of each speech inputted from the speech input means 1101 and the dictionary data obtained from the model distribution means 1303, then translates the input speech into text data to be assumed as recognition data. The speech recognition means 1102 passes the text data to the minutes recording means 1401. The minutes recording means 1401 then receives the recognition data for each of the users through a network to generate minutes data. The minutes displaying means 1402 displays the minutes data on the user's terminal screen.

Figure 14:
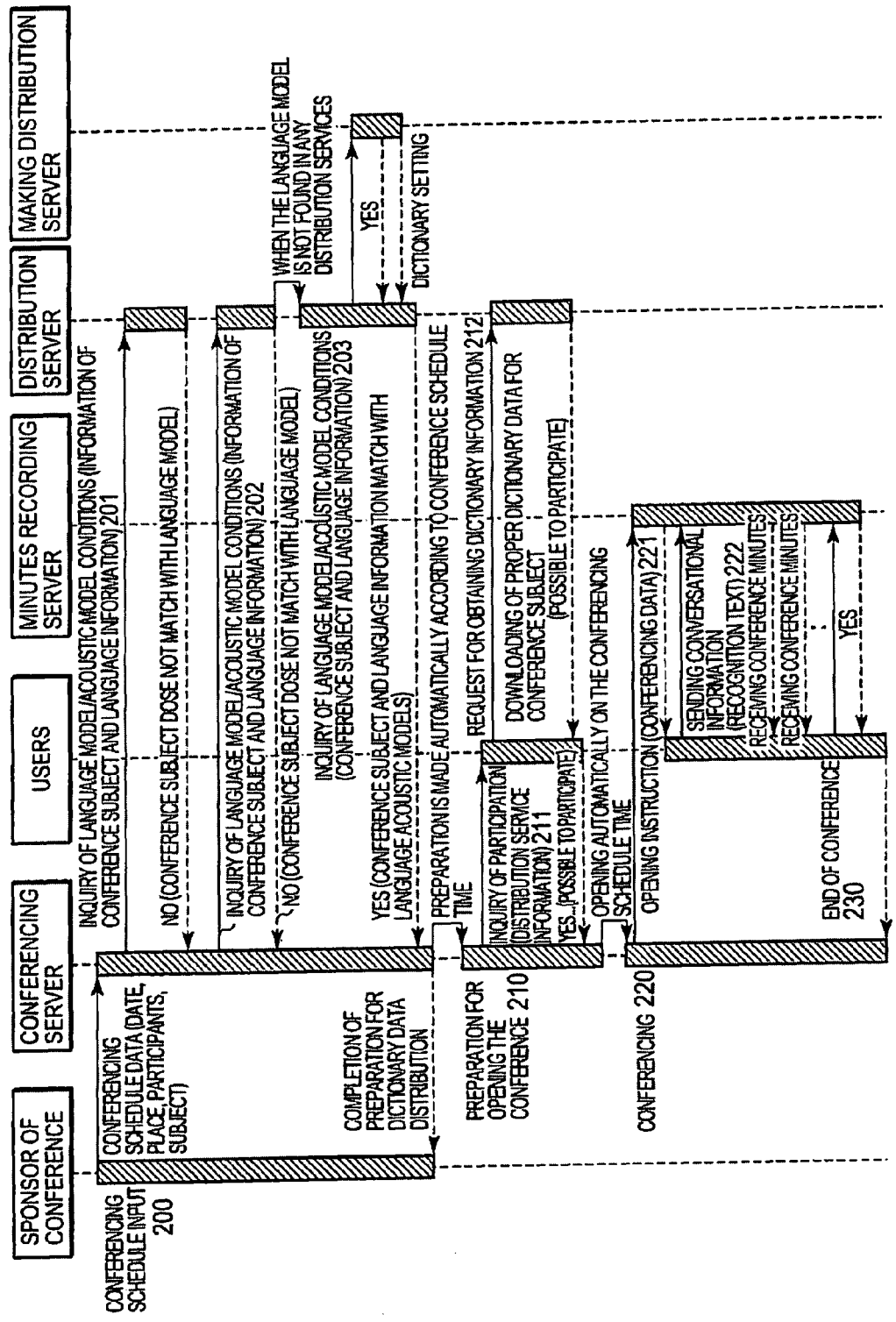
FIG. 14 is a sequence diagram for showing the operation of the minutes recording unit.
Figure 15:
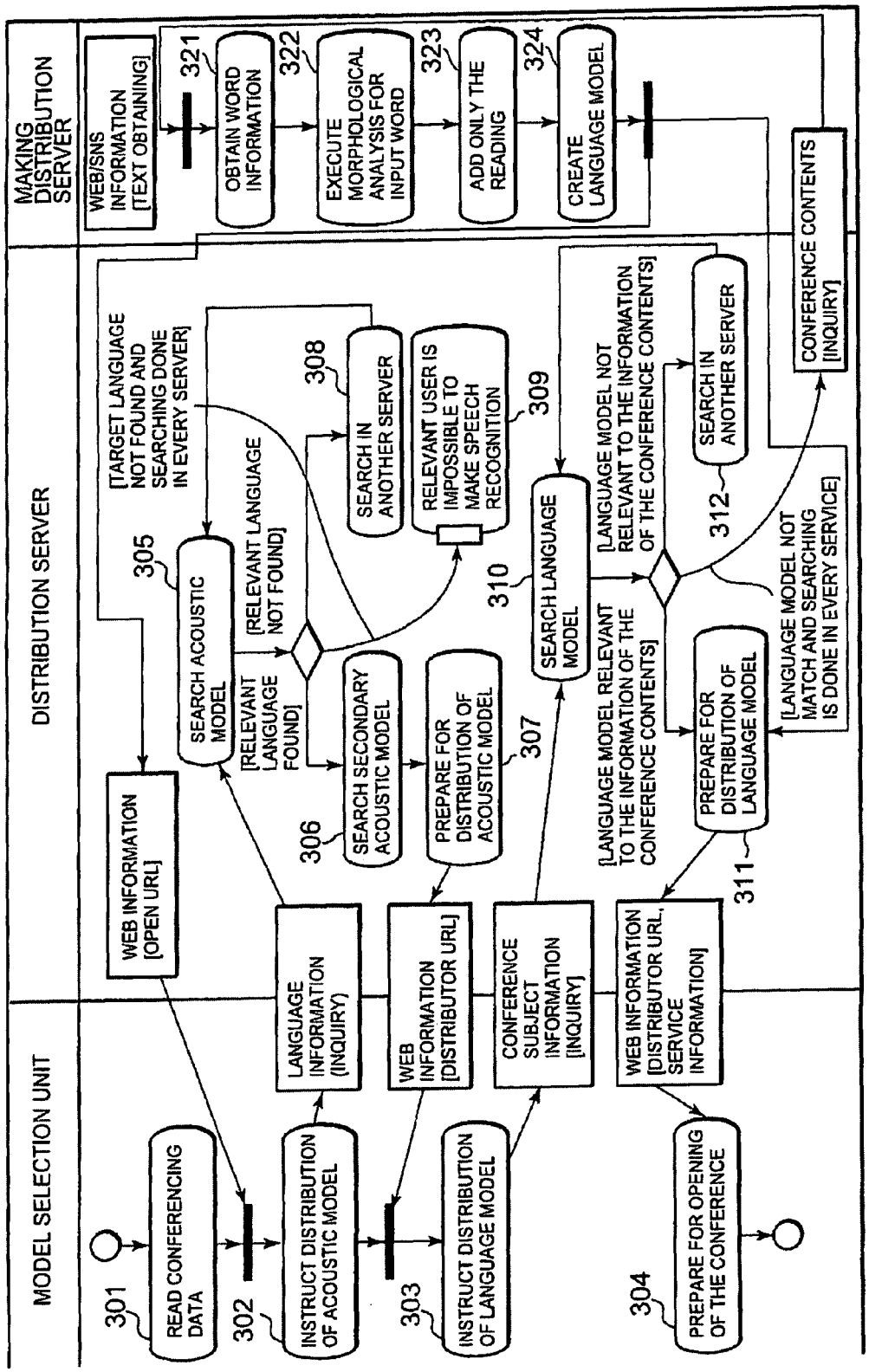
FIG. 15 is an activity diagram for showing the operation of the minutes recording unit.

Next, there will be described in detail the operation of the speech recognition system in the second embodiment of the present invention with reference to a sequence diagram shown in FIG. 14 and an activity diagram shown in FIG. 15. At first, the conference sponsor 532 inputs the conferencing schedule data and register the schedule data in the conferencing server 531 before opening the conference (step 200 in FIG. 14). Then, the conferencing server 531 searches an optimal distribution server from among those (550, 551, ...). In FIG. 14, the conferencing server 531 makes an inquiry to each of those distribution servers according to the conference subject information and the language information included in the characteristic information and receives an answer from each distribution server. The answer indicates an effect that the subject information and the language model do not match with each other in the distribution server (steps 201 and 202 in FIG. 14). FIG. 15 shows details of a sequence of the process from inquiry to answer.

The model selection unit 1020 obtains WEB information from the distribution server 1030 and reads the conferencing data (step 301 in FIG. 15). Then, the model selection unit 1020 executes an acoustic model distribution instruction 302. In response to the acoustic model distribution instruction 302, language information is sent to the distribution server 1030. The distribution server 1030 then executes the process of acoustic model searching 305 according to the received language information. If the language information is not found in its own server, the distribution server 1030 executes another server searching 308 until the information is found as many times as the number of the distribution servers (550, 551, . . . ). If the language information is found in a distribution server 1030, the model selection unit 1020 determines an acoustic model matching with the user's dialect information in the process of acoustic model secondary searching 306, then executes the process of acoustic model distribution preparation 307. In the process of the acoustic model distribution preparation 307, the distribution server 1030 returns the distributor URL information to the conferencing server 531. In such a way, the distribution server 1030 determines an acoustic model downloading source. After that, the model selection unit 1020 executes the language model distribution instruction 303. In response to the language model distribution instruction 303, conference subject information is sent to the distribution server 1030. The distribution server 1030 then executes the process of language model searching 310 according to the conference subject information. If the language model is not found in its own service, the distribution server 1030 executes another service searching 312 until the information is found as many as the number of the distribution servers (550, 551, . . . ). If the language model cannot be identified even when the searching is done over the total number of services, the distribution server 1030 requests the making distribution server 560 to create a language model. Thus the making distribution server 560 creates a language model matching with the conference subject information (step 203 in FIG. 14).

The making distribution server 560 obtains text information in each field from WEB, SNS, etc. (step 321 in FIG. 15) and executes a morphological analysis (step 322 in FIG. 15) and reading (step 323 in FIG. 15) to create a language model (step 324 in FIG. 15). The created language model in each field is stored. After that, a language mode matching with the conference subject information is determined in the process of language model searching 310, then the distribution server 1030 executes the process of language model distribution preparation 311. The distribution server 1030 then returns the relevant URL and the service information to the conferencing server 531. Repeating these processes, the distribution server 1030 makes necessary arrangements for distributing dictionary data before opening the conference. The conferencing server 531 also confirms the possibility of each user's participation in the conference before opening the conference (steps 210 and 211 in FIG. 14) and each user who can participate in the conference downloads the dictionary from one of the distribution servers (550, 551, . . . ) (step 212 in FIG. 14). When the conferencing time reaches, the conferencing server 531 sends conferencing data to the minutes recording server 531 (step 221 in FIG. 14). Consequently, each of the terminals (511, 512, 513, 521, and 522) is enabled to receive each input speech as data of the conference minutes (step 222 in FIG. 14). The minutes recording server 531 keeps recording the minutes until the end of the conference (step 230 in FIG. 14).

The distribution server 531 and the making distribution server 560 may be the same.

Next, there will be described the effects of the second embodiment of the present invention. In this second embodiment, in addition to the effects of the first embodiment, the following effect is also expected. If the target language model does not exist, a language model is created before opening the conference from the dictionary information in each field collected beforehand and the conference subject information, then downloaded automatically to each of the terminals (511, 512, 513, 521, and 522). Thus in the second embodiment the recognition results appropriate to any conference subject can be obtained.

Next, a third embodiment of the present invention will be described in detail.

Figure 16:
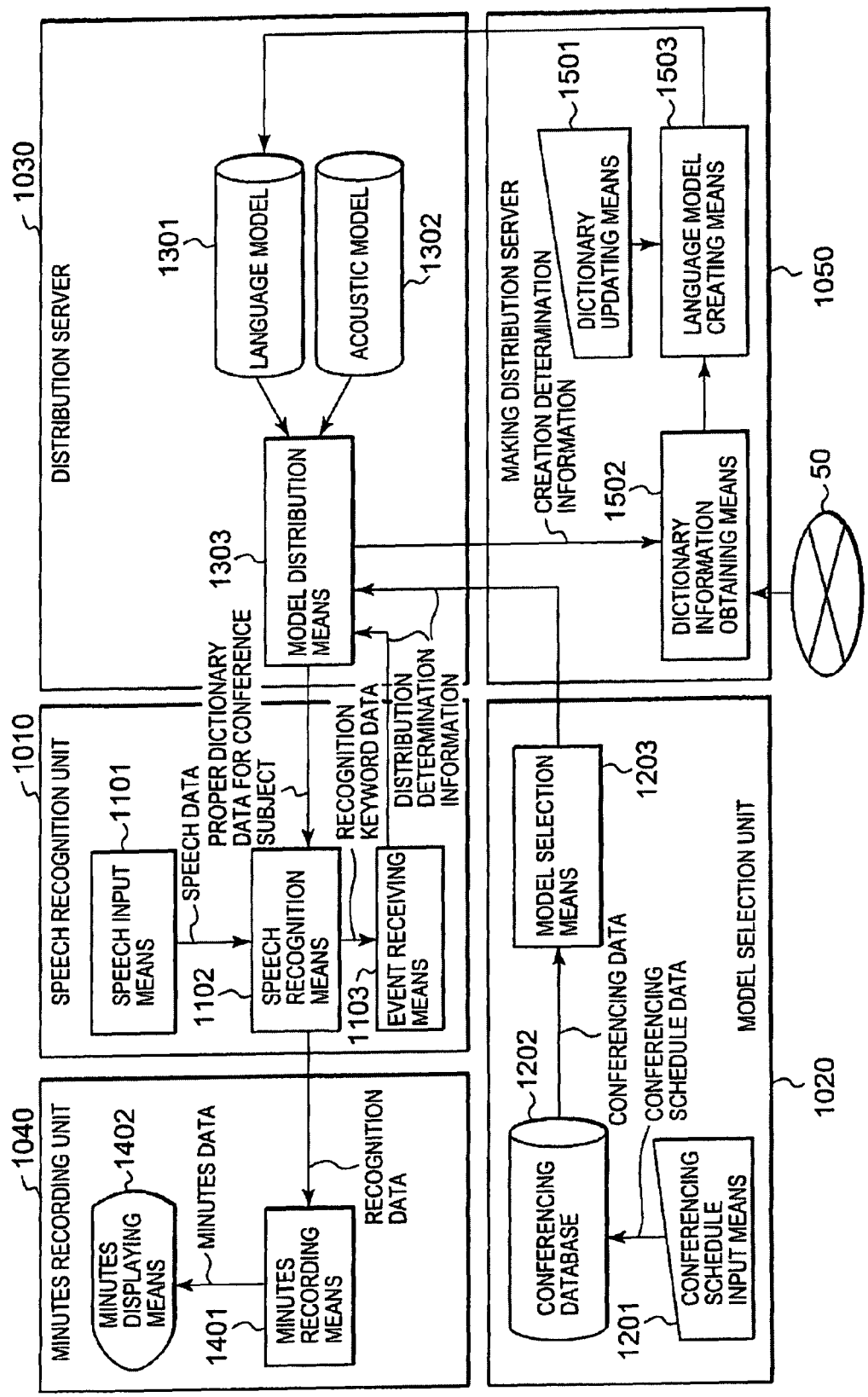
FIG. 16 is a concept diagram for showing a configuration of a minutes recording unit in a third embodiment of the present invention.

As shown in FIG. 16, in this third embodiment, an event receiving means 1103 is added to the system configuration in the second embodiment (FIG. 13). Other configuration items in this third embodiment are the same as those in the second embodiment. In other words, in this third embodiment, in addition to the processes of minutes recording, model selection, as well as the same processes by the distribution server 531 and the making distribution server 560, the following process is added; if a specific recognition keyword is inputted in a speech, the event receiving means 1103 instructs the model distribution means 1303 to distribute language and acoustic models appropriate to the keyword. In this third embodiment, when a user inputs a specific speech, the proper language and acoustic models can be downloaded even during the conference. Consequently, this third embodiment can expect obtainment of a recognition result matching with any suddenly changed conference subject. In this third embodiment, it is also possible to add the event receiving means 1105 to the system configuration in the first embodiment.

While this invention has been described in conjunction with the preferred embodiments described above, it will now be possible for those skilled in the art to put this invention into practice in various other manners.

I claim:

1. A speech recognition method performed by a speech recognition system including hardware, comprising:
    storing in a conference database of the speech recognition system, dialect information of each user of one or more users, subject information, and resume information;
    selecting, by a model selection unit of the speech recognition system, an acoustic model for each user based on said dialect information of each user and a language model based on said subject information and said resume information; and
    translating, by a speech recognition unit of the speech recognition system, input speech into text data based on said selected acoustic model and language model.

2. The speech recognition method according to claim 1, said method further comprising:
    obtaining, by a dictionary information obtaining unit of the speech recognition system, dictionary information for each field; and
    creating, by a language model creating unit of the speech recognition system, a new language model based on said dictionary information and adding, by said language model creating unit, said new language model to a selection object of said model selection unit.

3. The speech recognition method according to claim 2, said method further comprising:
    obtaining said dictionary information of each field from Web; and
    creating said new language model by creating a morphological analysis of said obtained dictionary information.

4. The speech recognition method according to claim 2, said method further comprising:
 changing, by an event receiving unit of the speech system, said selected acoustic model or language model based on a specific recognition keyword when said specific recognition keyword is input.

5. The speech recognition method according to claim 1, said method further comprising:
 changing, by an event receiving unit of the speech recognition system, said selected acoustic model or language model based on a specific recognition keyword when said specific recognition keyword is input.

6. A server connected to a distribution terminal distributing a recognition model and a user terminal recognizing input speech and a server through a network, said server comprising:
 a conference database to store dialect information of each user of one or more users, subject information, and resume information;
 a model selection unit to select an acoustic model for each user based on said dialect information of each user and a language model based on said subject information and said resume information; and
 a speech recognition unit to translate input speech into text data based on said selected acoustic model and language model,
 wherein at least one of the model selection unit and the speech recognition unit comprises hardware.

7. The server according to claim 6, said server further comprising:
 a dictionary information obtaining unit to obtain dictionary information for each field; and
 a language model creating unit to create a new language model based on said dictionary information and adding, by said language model creating unit, said new language model to a selection object of said model selection unit.

8. A speech recognition system, comprising:
 a conference database to store dialect information of each user of one or more users, subject information, and resume information;
 model selection means for selecting an acoustic model for each user based on said dialect information of each user and a language model based on said subject information and said resume information; and
 speech recognition means for translating input speech into text data based on said selected acoustic model and language model,
 wherein at least one of the model selection means and the speech recognition means comprises hardware.

\* \* \* \* \*